United States Patent [19]

Suzuki

[11] Patent Number: 5,189,931

[45] Date of Patent: Mar. 2, 1993

[54] ELECTRONICALLY CONTROLLED AUTOMATIC TRANSMISSION

[75] Inventor: Kenji Suzuki, Okazaki, Japan

[73] Assignee: Aisin AW Co., Ltd., Japan

[21] Appl. No.: 743,525

[22] Filed: Aug. 12, 1991

[30] Foreign Application Priority Data

Sep. 4, 1990 [JP] Japan .................................. 2-232488

[51] Int. Cl.⁵ ............................................. B60K 41/18
[52] U.S. Cl. ...................................... 74/866; 74/856; 74/861; 364/424.1
[58] Field of Search .................. 74/856, 857, 859, 861, 74/865, 866, 867; 364/424.1

[56] References Cited

U.S. PATENT DOCUMENTS

| | | | |
|---|---|---|---|
| 4,308,765 | 1/1982 | Iwanaga et al. | 74/867 X |
| 4,488,456 | 12/1984 | Taga et al. | 74/866 |
| 4,552,036 | 11/1985 | Takano et al. | 74/867 X |
| 4,736,301 | 4/1988 | Osanai | 74/866 X |
| 4,836,055 | 6/1989 | Suzuki | 74/866 |
| 4,836,056 | 6/1989 | Nakawaki | 74/866 |
| 4,939,957 | 7/1990 | Asano et al. | 74/866 |
| 4,982,621 | 1/1991 | Sano | 74/866 |
| 5,050,454 | 9/1991 | Yamaguchi et al. | 74/859 X |

Primary Examiner—Leslie A. Braun
Assistant Examiner—William O. Trousdell
Attorney, Agent, or Firm—Lorusso & Loud

[57] ABSTRACT

An electronically controlled automatic transmission includes a device for calculating an actual engine load from an engine speed and a value detected by a device for detecting a state of engine intake air; a device for determining an engine load expected from a throttle opening and the engine speed; and a device for determining a correction coefficient from the two engine loads. A throttle opening detected is corrected by the correction coefficient, and a required control oil pressure is determined from the corrected throttle opening. The required control oil pressure may alternatively be directly corrected by the correction coefficient, or a throttle-opening dividing point for setting a speed-change point may be altered by the correction coefficient.

14 Claims, 16 Drawing Sheets

ELECTRONICALLY CONTROLLED AUTOMATIC TRANSMISSION

BACKGROUND OF THE INVENTION

1. Field of the Invention

The present invention relates to an electronically controlled automatic transmission.

2. Description of the Related Art

In electronically controlled automatic transmissions, various controls, including speed-change control using solenoid valves, lockup clutch control for a torque converter, line pressure control, and engine torque control, all conventionally effected by electronic control.

Regardless of whether an electronic control system or a hydraulic control system is used, a speed-change stage is determined through throttle opening and vehicle speed, and a first shift solenoid and a second shift solenoid are subjected to on-off control. At the same time, control of hydraulically controlled solenoids is determined on the basis of the throttle opening, speed-change stage, etc., so as to set line pressure for generating engaging pressure for such as speed-change clutches, brakes, and the like. In addition, consideration is given to the durability of input torque of a transmission to ensure a sufficient torque capacity, while oil pressure is set in such a manner as not to cause a feeling of slowing during speed-change.

However, with the above-described conventional electronically controlled automatic transmission, the reduction of the engine torque results in an undesirable sensation of the speed-change.

That is, since engines are generally tuned up for normal conditions of use, there are instances where, during running on highland when the temperature is high, the engine torque declines temporarily due to a drop in the air density.

In that case, since the aforementioned line pressure is set on the basis of the throttle opening which serves as a characteristic indicative of engine torque, the line pressure becomes excessively large relative to the input torque of the transmission, and speed-change shock occurs during a speed change.

The occurrence of speed-change shock will be described with reference to FIGS. 2 and 3.

FIG. 2 is a diagram illustrating relationships between time and output torque, and FIG. 3 is a diagram illustrating relationships between engine load and throttle.

As shown in FIG. 2, during running on flatland, in a case where a speed change is effected through an increase in oil pressure P supplied to hydraulic servos for such as clutches and brakes, it is possible to obtain a predetermined speed-change time, and the speed-change shock is small. However, if the engine torque declines, the line pressure becomes excessively large, and the speed-change time becomes short, with the result that speed-change shock increases by that margin.

In FIG. 3, the abscissa indicates engine load EL, while the ordinate indicates throttle opening VTH. The engine load EL is expressed percentagewise by calculating such that, if the amount of intake air introduced into the engine is AF and the engine speed is NE, then AF/NE during idling is set as 0%, and AF/NE during maximum torque is set as 100%. The drawing reveals that the engine load EL is lower in the case of a 1000-m altitude than in the case of a 0-m altitude, at the same engine speed of 3000 rpm and temperature of 25° C.

Although adjustment of the line pressure is conventionally undertaken to prevent the occurrence of speed-change shocks (refer to Japanese Patent Application Laid-Open No. 1-279151), the correction of the line pressure is effected only relative to the throttle opening. With this technique, therefore, it is impossible to prevent speed-change shocks occurring due to the differences between places of running.

SUMMARY OF THE INVENTION

Accordingly, it is an object of the present invention to provide an electronically controlled automatic transmission which does not cause an occupant to feel a slowing during speed-change even when the vehicle is run on high elevations, at high temperatures, or under similar adverse conditions, thereby overcoming the above-described drawback of the conventional art.

To this end, in accordance with the present invention, there is provided an electronically controlled automatic transmission comprising: a throttle opening sensor for detecting throttle opening; means for detecting a state of engine intake air as either an amount of engine intake air or intake air pressure; an engine speed sensor for detecting engine speed; a plurality of shift solenoids for selectively supplying oil to hydraulic servos of speed-changing elements; an oil-pressure control solenoid for controlling oil pressure to be supplied to the hydraulic servos; means for calculating an actual engine load from the detected engine speed and the detected value for engine intake air; means for determining an engine load expected from (predetermined for) the throttle opening and the engine speed; means for determining a correction coefficient from the two engine loads; and means for correcting the detected throttle opening by the correction coefficient.

In addition, there is also provided means for correcting the detected throttle opening by the correction coefficient, and for determining a required control oil pressure from the corrected throttle opening.

Instead of the means for determining the control oil pressure from the corrected throttle opening, it is possible to adopt means for directly correcting the required control oil pressure by the correction coefficient.

Furthermore, instead of the means for determining the control oil pressure from the corrected throttle opening, it is possible to adopt means for altering a throttle-opening dividing point for setting a speed-change point, by the correction coefficient.

In accordance with the present invention, as described above, the electronically controlled automatic transmission comprises a throttle opening sensor for detecting a throttle opening; means for detecting a parameter for engine intake air i.e., either the amount of engine intake air or intake air pressure; an engine speed sensor for detecting engine speed; a plurality of shift solenoids for selectively supplying oil to hydraulic servos of speed-changing elements; and an oil-pressure control solenoid for regulating oil pressure to be supplied to the hydraulic servos.

Accordingly, the vehicle speed and a speed-change point is compared in each divided area of the throttle opening, and the speed-change stage is changed accordingly.

In addition, as described above, the electronically controlled automatic transmission further comprises means for calculating actual engine load from the engine speed and detected value of a parameter for engine intake air; means for determining an engine load expected from the throttle opening and the engine speed; and means for determining a correction coefficient from the two engine loads. Therefore, the detected throttle opening is corrected by the correction coefficient, and a required control oil pressure is determined from the corrected throttle opening.

Accordingly, even if the amount of intake air or the intake air pressure changes as during running at high elevations, the throttle opening is corrected in a corresponding manner, and a proper control oil pressure is obtained. Hence, it is possible to prevent the occurrence of speed-change shocks.

In addition, instead of determining the control oil pressure from the corrected throttle opening, the required control oil pressure may be directly corrected by the correction coefficient.

Moreover, instead of determining the control oil pressure from the corrected throttle opening, the throttle-opening threshold point for a speed-change may be altered by the correction coefficient.

The above and other objects, features and advantages of the present invention will become more apparent from the following detailed description of the invention when read in conjunction with the accompanying drawings.

DESCRIPTION OF THE PREFERRED EMBODIMENTS

Referring now to accompanying drawings, a detailed description will be given of the embodiments of the present invention.

Figure 1:
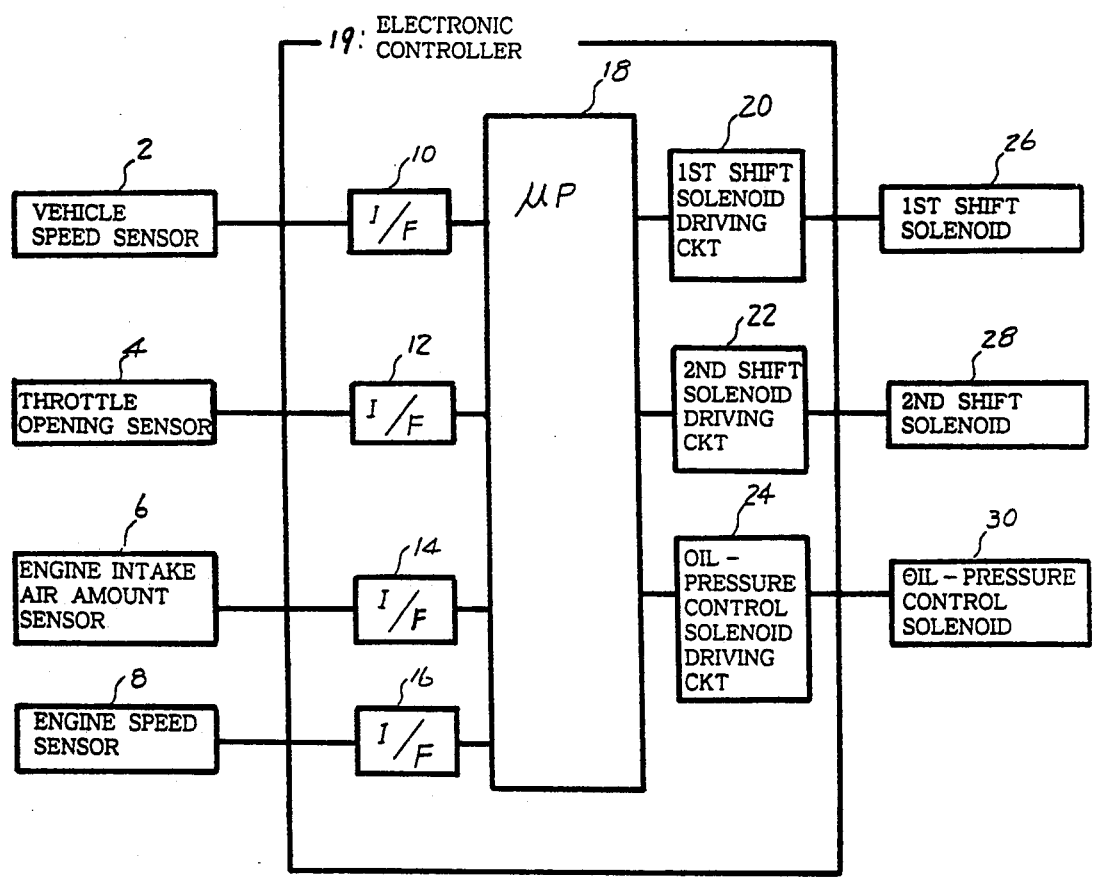
FIG. 1 is a block diagram for a control system of an electronically controlled automatic transmission in accordance with the present invention.
Figure 2:
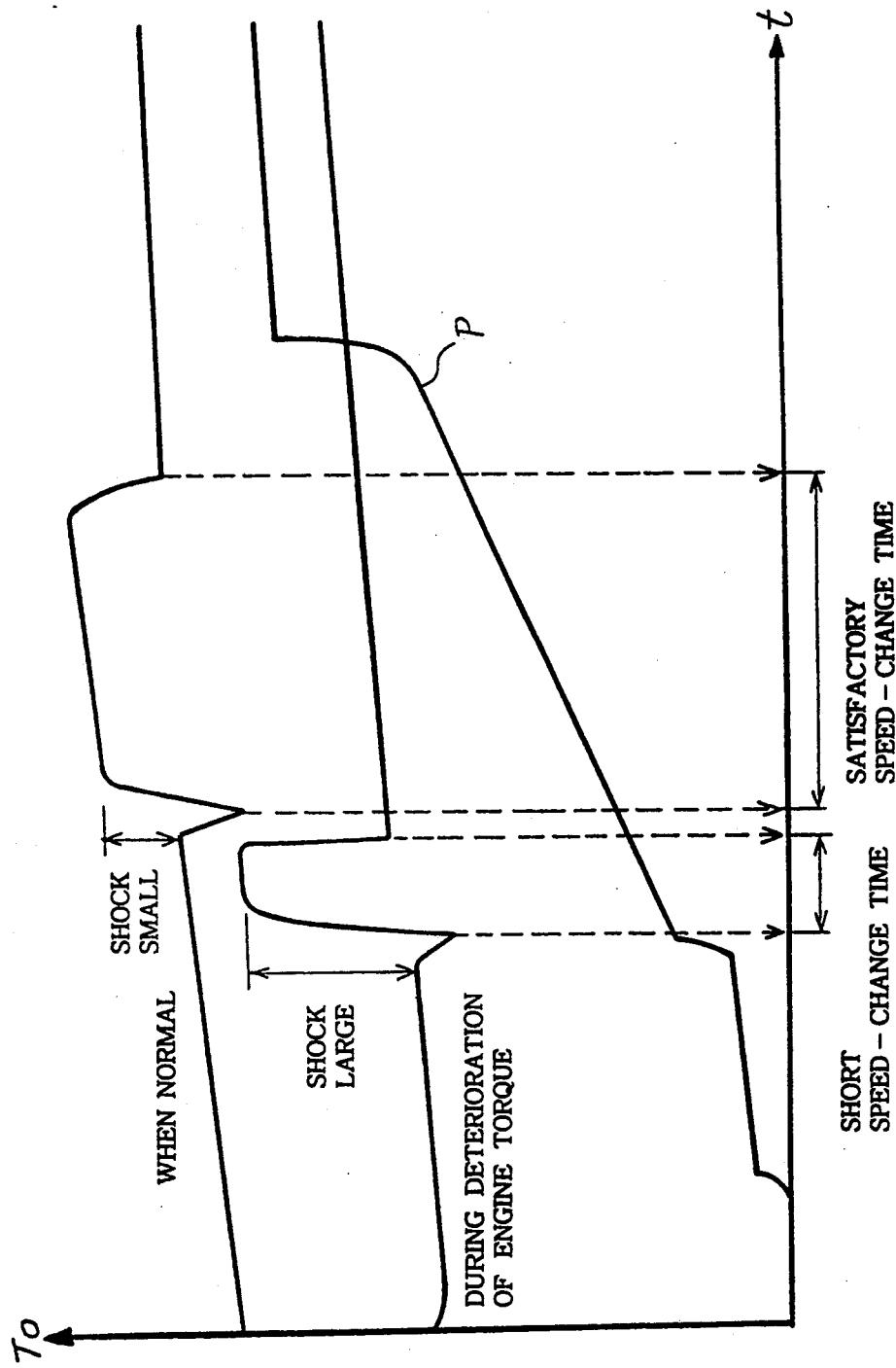
FIG. 2 is a diagram illustrating relationships between time and output torque.
Figure 3:
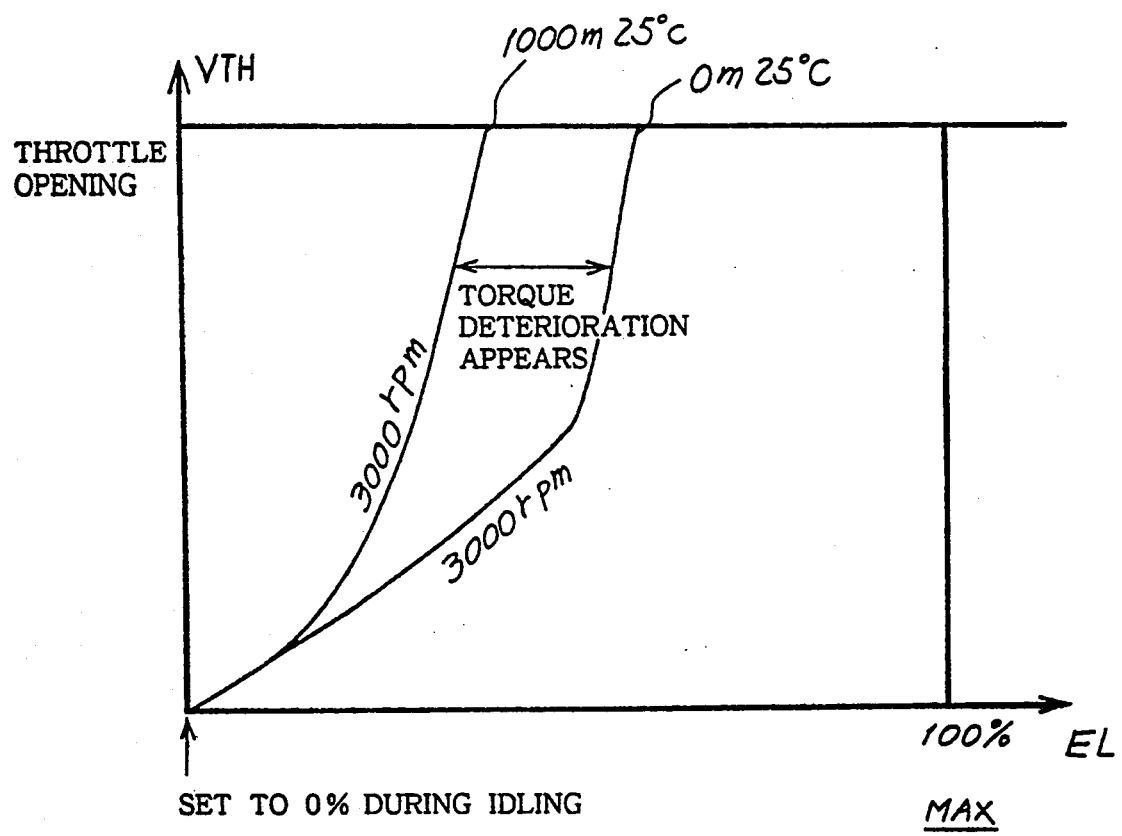
FIG. 3 is a diagram illustrating relationships between engine load and throttle opening.

As shown in FIG. 1, a vehicle sensor 2 detects a vehicle speed SP; a throttle opening sensor 4 detects a throttle opening VTH; an engine intake air amount sensor 6 detects the amount of air intake for the engine; and an engine speed sensor 8 detects engine speed. An electronic controller 19 comprises interfaces (I/Fs) 10, 12, 14, 16 for the sensors 2, 4, 6, 8; a microprocessor ($\mu$P) 18 for controlling the overall electronic controller 19; and a first shift solenoid driving circuit 20, a second shift solenoid driving circuit 22, and an oil-pressure control solenoid driving circuit 24, respectively adapted to control a first shift solenoid 26, a second shift solenoid 28, and an oil-pressure control solenoid 30. The first and second shift solenoids 26, 28 are used to selectively engage or release brakes, clutches, and the like for speed change. The oil-pressure control solenoid 30 is electrically controlled to change the line pressure. The oil-pressure control solenoid 30 is constituted by a linear solenoid.

In the electronically controlled automatic transmission having the above-described configuration, the engine load (%) is determined from an amount of air intake AF introduced into the engine and an engine speed NE.

Conventionally, it is known that the engine torque can be determined by $K \times EL$ (K: constant). That is, a drop in engine torque appears as a decline in the engine load EL, and even if the engine speed NE is the same, the engine load EL declines during running at a high elevation.

Accordingly, as a parameter having a characteristic which substitutes the engine torque, the engine load EL is used so as to change the line pressure.

In this case, values of the engine load EL with the throttle opening VTH and the engine speed NE varied at the time when the speed-change points are set for the transmission, i.e., at an altitude of 0 m and a temperature of 25° C., are stored in advance. In addition, differences between those values of the engine load EL and those of the engine load EL during actual running are determined, and the line pressure, which is control oil pressure, is reduced on the basis of the differences.

As a result, the line pressure is prevented from becoming excessively large relative to the input torque of the transmission, thereby preventing a decline in the shift feeling at the time of a speed change.

Next, a description will be given of a hydraulic circuit adopted in the electronically controlled automatic transmission having the above-described configuration.

Figure 4A:
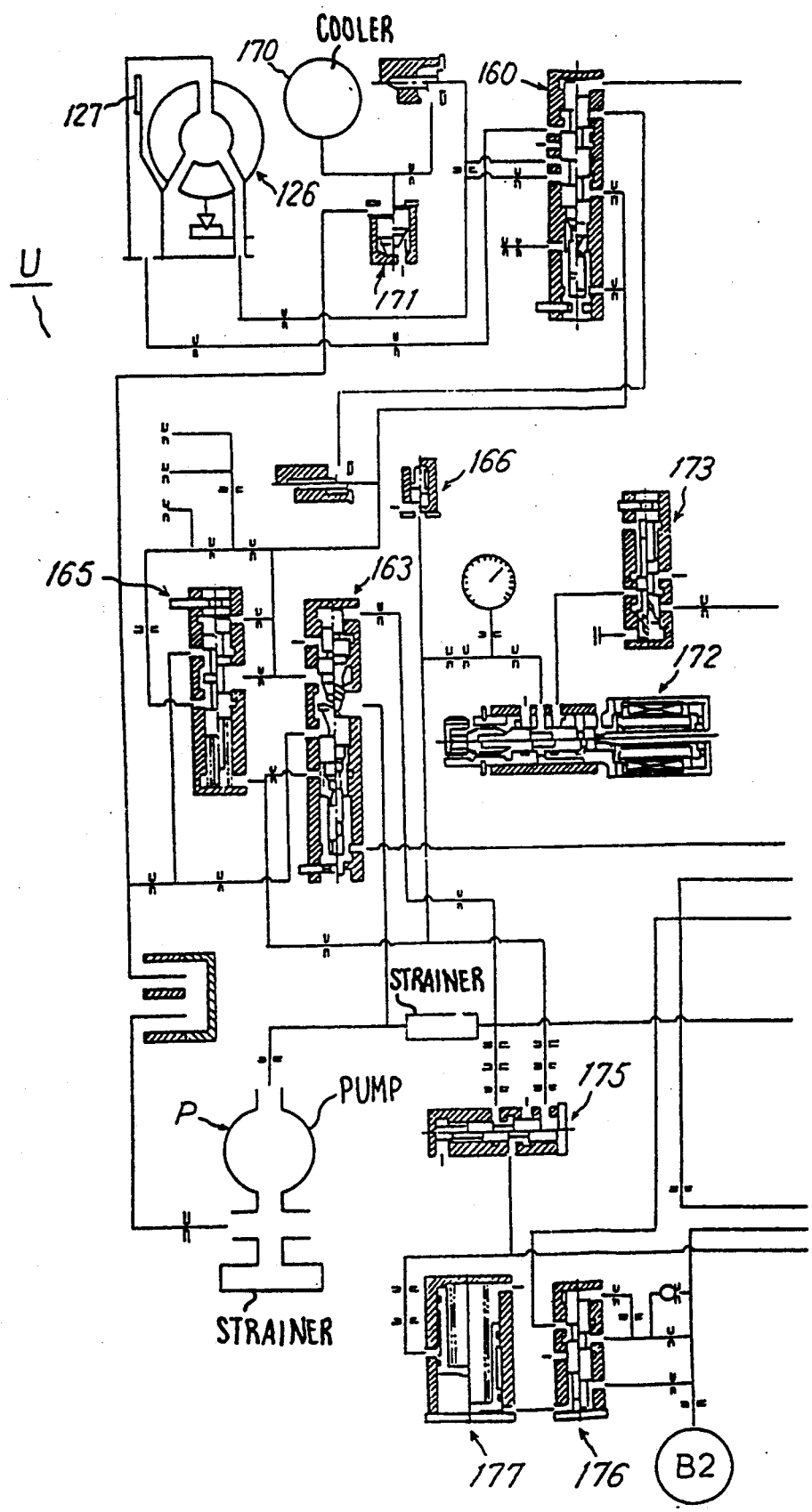
FIG. 4 is a hydraulic circuit diagram adopted in the electronically controlled automatic transmission of the present invention.
Figure 4B:
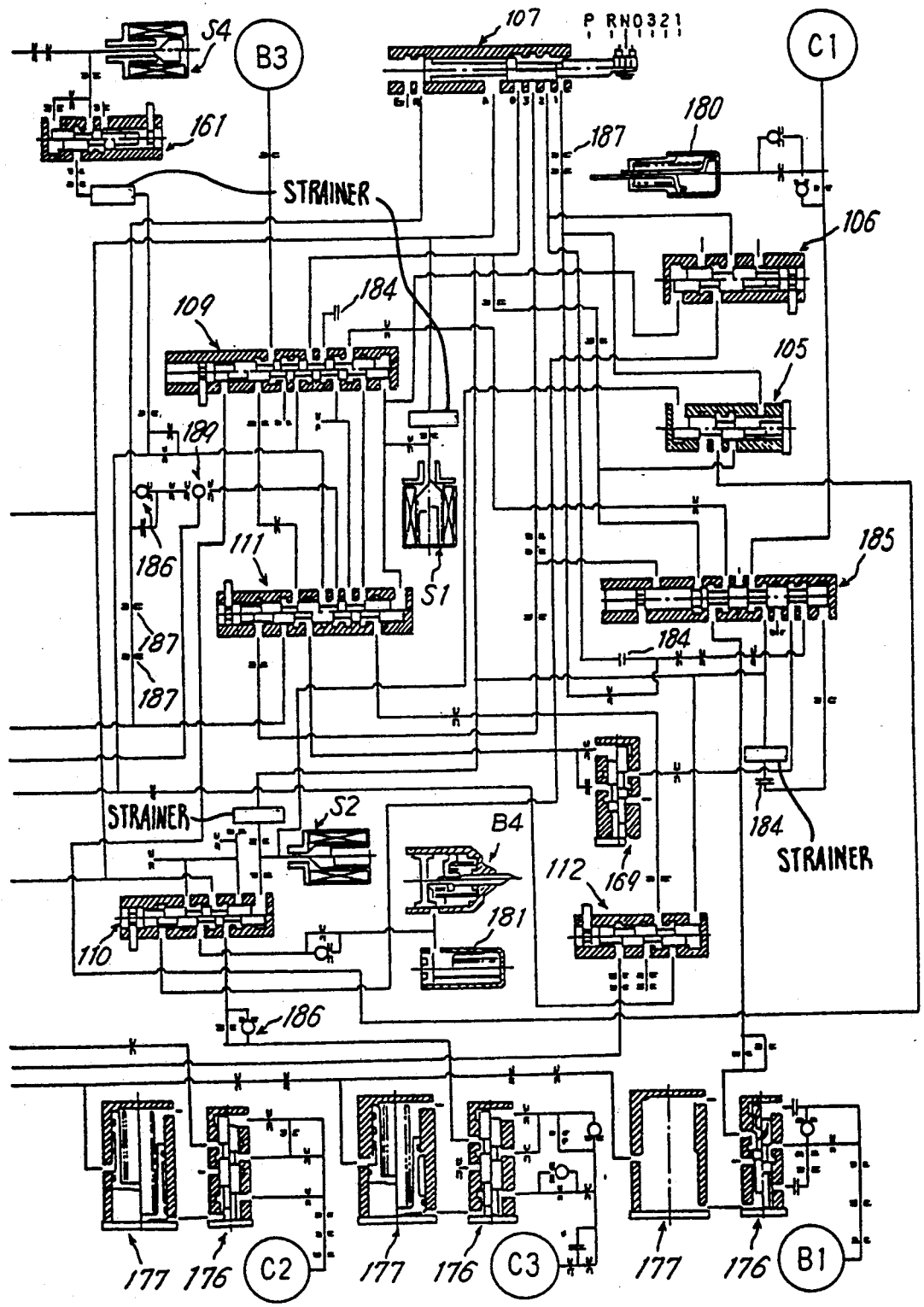

The hydraulic circuit U shown in FIG. 4 comprises hydraulic servos C1, C2, C3 for clutches $C_1$, $C_2$, $C_3$; hydraulic servos B1, B2, B3, B4 for brakes $B_1$, $B_2$, $B_3$, $B_4$; a manual valve 107; a 1st–2nd shift valve 109; a 2nd–3rd shift valve 110; a 3rd–4th shift valve 111; a first solenoid valve S1 (i.e., the first shift solenoid 26 in FIG. 1) for controlling the 1st–2nd shift valve 109 and the 3rd–4th shift valve 111; and a second solenoid valve 28 (i.e., the second shift solenoid 28 in FIG. 1) for controlling the 2nd–3rd shift valve 110.

The hydraulic circuit U further comprises a first emergency-controlling valve 105 and a second emergency-controlling valve 106 which serve as backup means at the time of failures (nonenergization) due to disconnections or the like of the solenoid valves S1, S2; a sequence valve for the first brake $B_1$; a lockup control valve 160; a fourth solenoid valve S4 for controlling the duty of the lockup control valve 160; and a lockup modulator valve 161 for stabilizing the duty control by the fourth solenoid valve S4.

Furthermore, the hydraulic circuit U comprises a primary regulator valve 163 for regulating the oil pressure supplied from a hydraulic pump P so as to form line pressure; a secondary regulator valve 165 for further regulating the line pressure so as to provide oil pressure for lubrication or the like; a pressure relief valve 166; a low modulator valve 169; an oil cooler 170, and a cooler bypass valve 171.

A line pressure solenoid 172 is constituted by a linear solenoid valve, and corresponds to the oil-pressure control solenoid 30 controlled by the electronic controller 19 of the electronically controlled automatic transmission of the present invention. The signal oil pressure formed by the line pressure solenoid 172 is sent to the primary regulator valve 163 so as to regulate the line pressure.

Reference numeral 175 denotes an accumulator control valve; 126, a torque converter; and 127, a lockup clutch. A pressure-regulating valve 176 and an accumulator 177 respectively communicate with the hydraulic servo B1 for the first brake, the hydraulic servo C2 for the second clutch, the hydraulic servo C3 for the third clutch, and the hydraulic servo B2 for the second brake, respectively. Case-mounted type accumulators 180, 181 communicate with the hydraulic servo C1 for the first clutch and the hydraulic servo B4 for the fourth brake, respectively.

In FIG. 4, a character 184 in the form of "=" in the hydraulic circuit shows that the hydraulic circuit is shut off by a separator plate.

A 4th-5th shift valve 185 used for the fifth speed does not have its control oil chamber closed by a separator. As a result, the hydraulic control unit U for controlling the four-speed automatic transmission can be used also as a valve body for a fifth-speed automatic transmission.

In addition, reference numeral 186 denotes a check valve with an orifice; 187, an orifice; and 189, a three-way changeover valve.

In the hydraulic circuit having the above-described configuration, an oil pressure signal such as throttle pressure formed by the line pressure solenoid 172 is sent to the primary regulator valve 163 so as to regulate the line pressure, and that line pressure is supplied to the respective hydraulic servos C1-C3, B1-B4. However, FIG. 5 shows an embodiment in which the oil pressure regulated by the line pressure solenoid is directly supplied to the hydraulic servos.

Figure 5A:
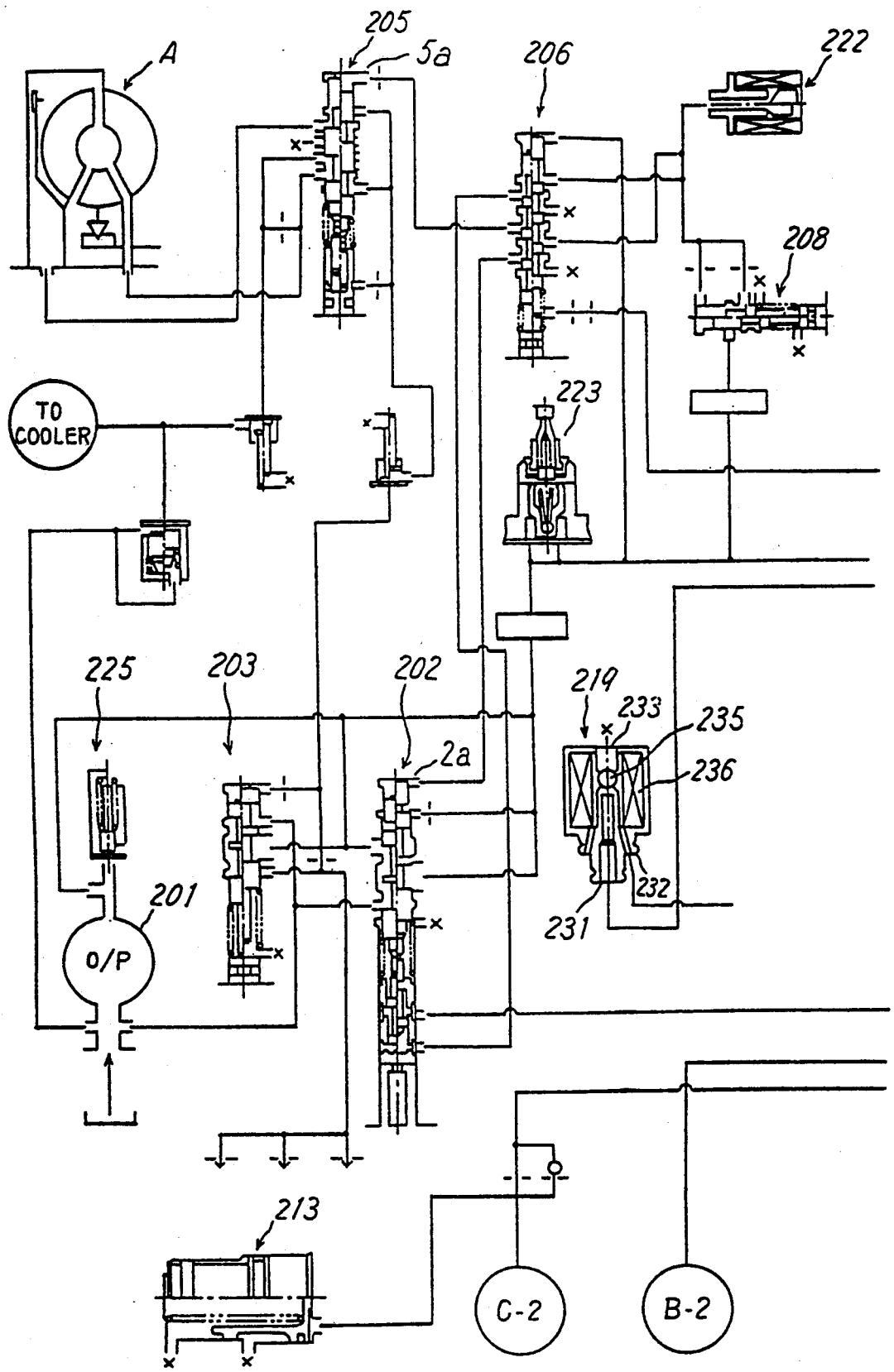
FIG. 5 is another hydraulic circuit diagram adopted in the electronically controlled automatic transmission of the present invention.
Figure 5B:
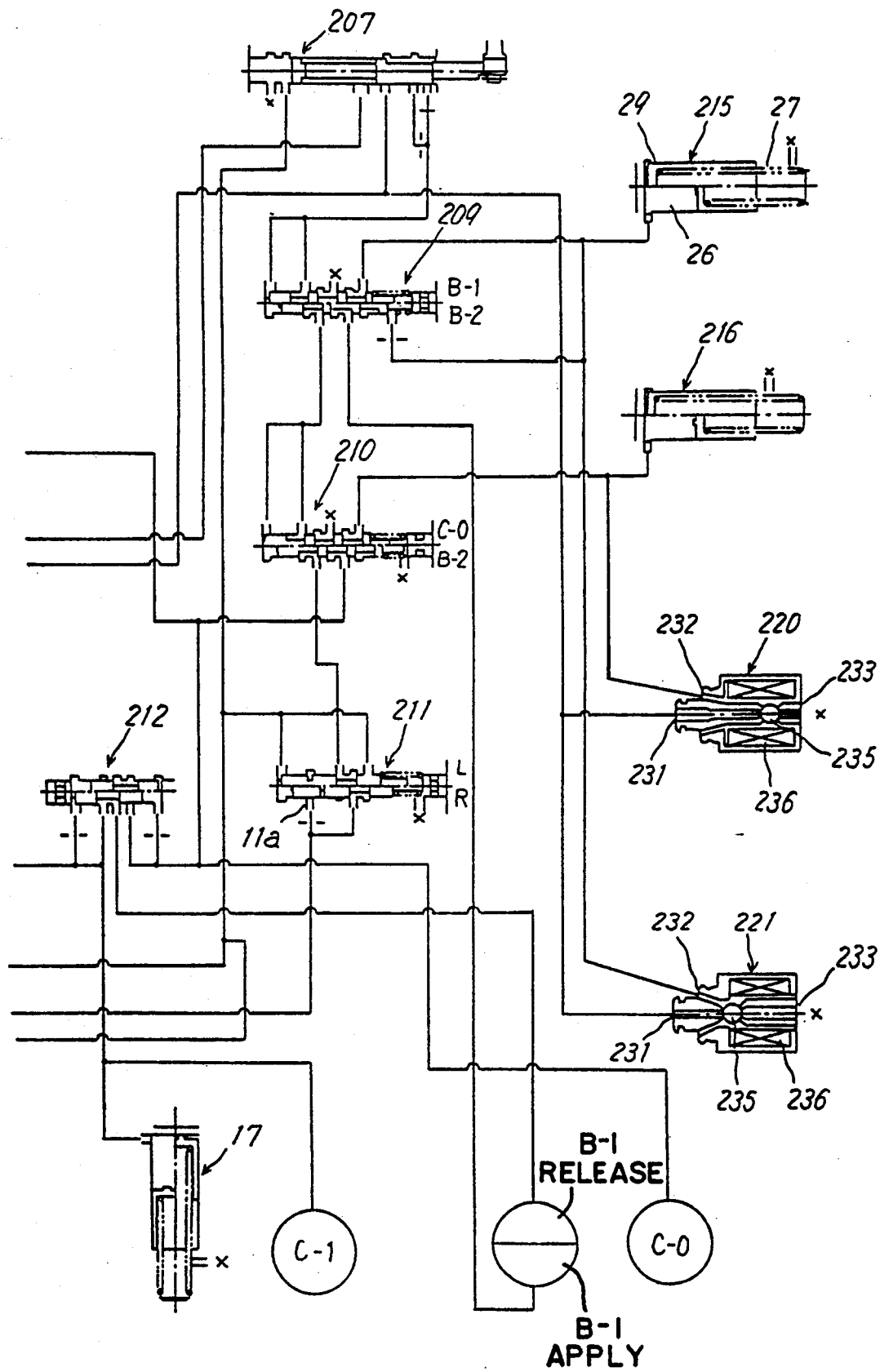

In FIG. 5, the hydraulic circuit comprises an oil pump 201; a primary regulator valve 202; a secondary regulator valve 203; a lockup control valve 205; a lockup relay valve 206; a manual valve 207; a modulator valve 208; a B-1 relay valve 209; a C-0 relay valve 210; a low modulator valve 211; a B-1 release relay valve (speed-change valve) 212; a C-2 accumulator 213; a B-1 damping valve 215; and a C-0 damping valve 216.

The hydraulic circuit further comprises a C-1 solenoid valve 219, a C-0 solenoid valve 220, and a B-1 solenoid valve 221. These solenoid valves not only supply oil to, and discharge oil from, the hydraulic servos C0-C2, B1, B2, but also regulate the oil pressure. The structure provided is such that the functions of the first and second shift solenoids 26, 28 and the oil-pressure control solenoid 30 are combined.

In addition, reference numeral 222 denotes a lockup solenoid valve and corresponds to a L-up solenoid 41 in FIG. 1. Reference numeral 223 denotes an oil temperature sensor, and 225 denotes a pressure relief valve.

The aforementioned speed-change solenoid valves 219, 229, 221 are constituted by three-way type valves, each having an input port 231 to which the line pressure is introduced, an output port 232, and a drain port 233, and a ball 235 being movably accommodated therein for selectively opening and closing the input port 231 and the drain port 233.

As for the C-1 solenoid valve 219 and the C-0 solenoid valve 220, the ball 235 closes the input port 231 and opens the drain port 233 when a coil 236 is energized, whereas the ball 235 opens the input port 231 and closes the drain port 233 when the coil 236 is de-energized.

As for the B-1 solenoid valve 221, on the other hand, the ball 235 closes the input port 231 and opens the drain port 233 when the coil 236 is de-energized, and opens the input port 231 and closes the drain port 233 when it is energized.

A description will now be given of the operation of the electronically controlled automatic transmission of the present invention.

Figure 6A:
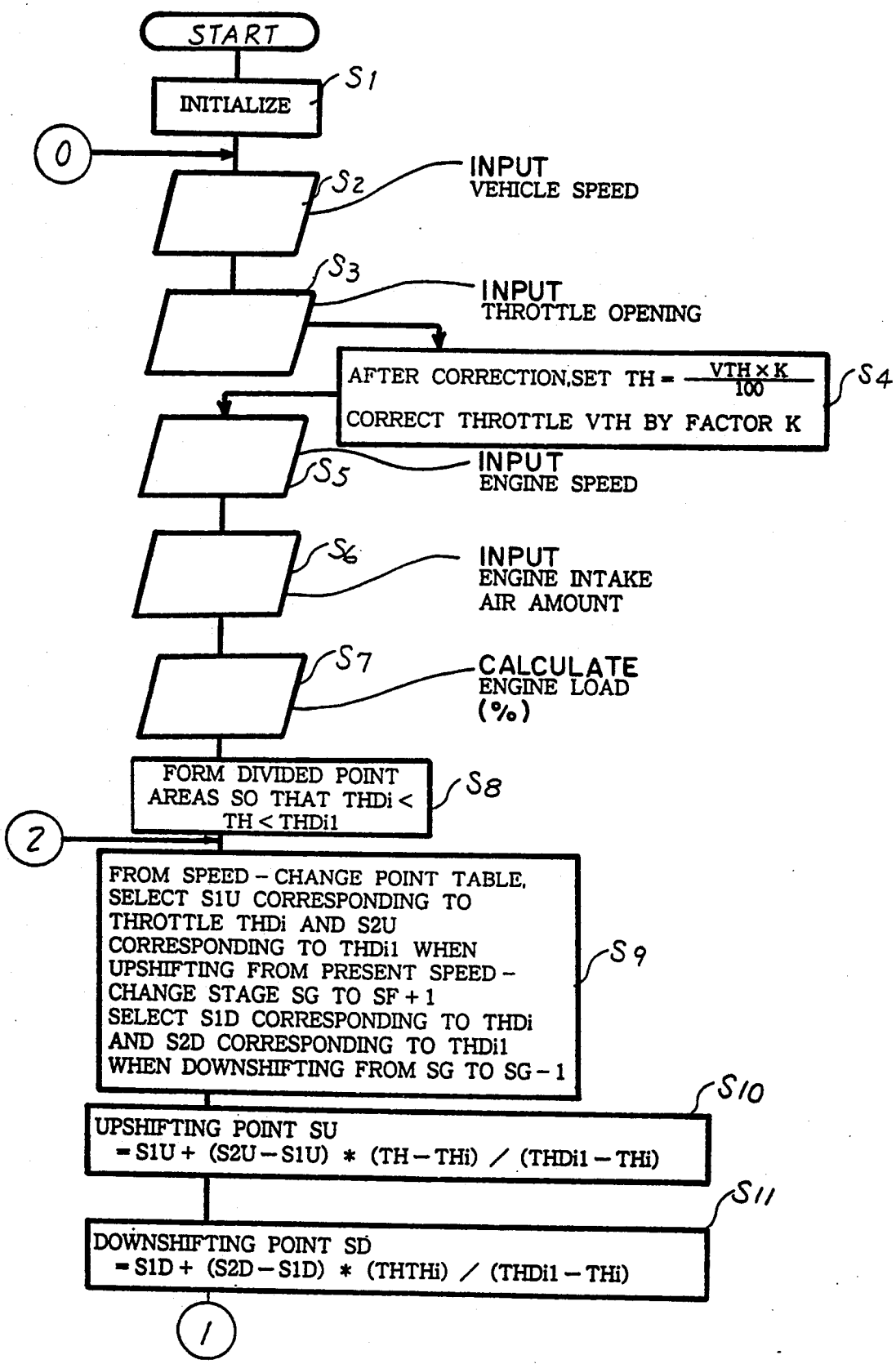
FIGS. 6A to 6C are flowcharts of the operation of the electronically controlled automatic transmission in accordance with a first embodiment of the present invention.
Figure 6B:
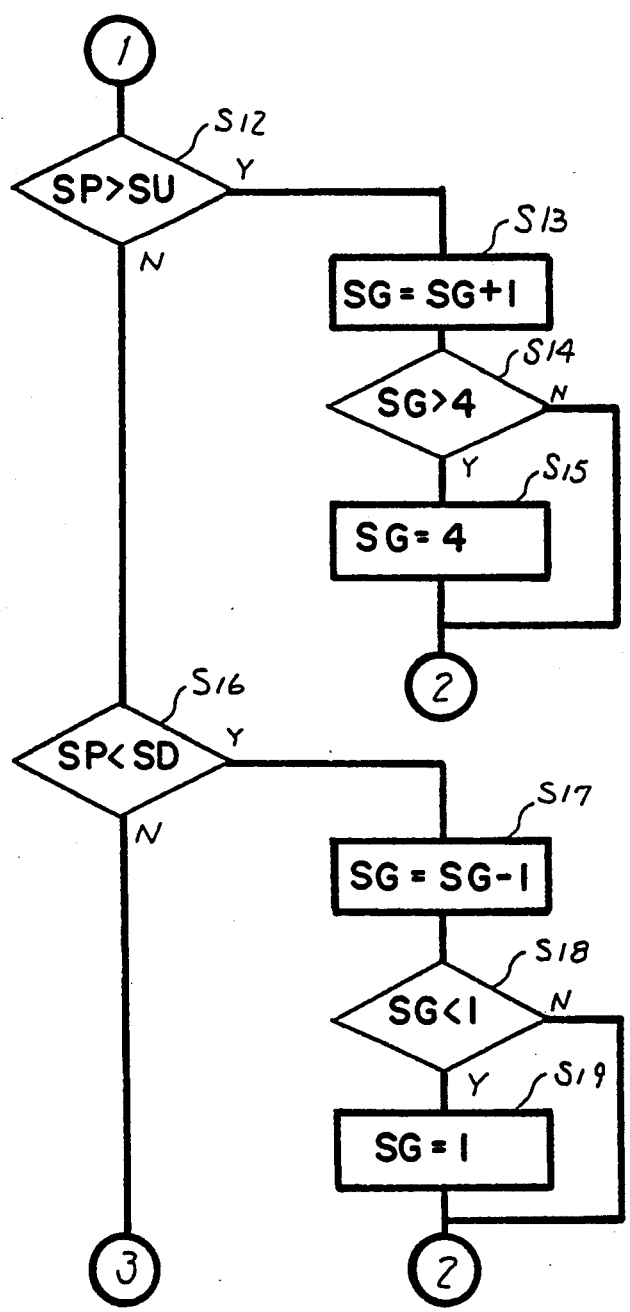
Figure 6C:
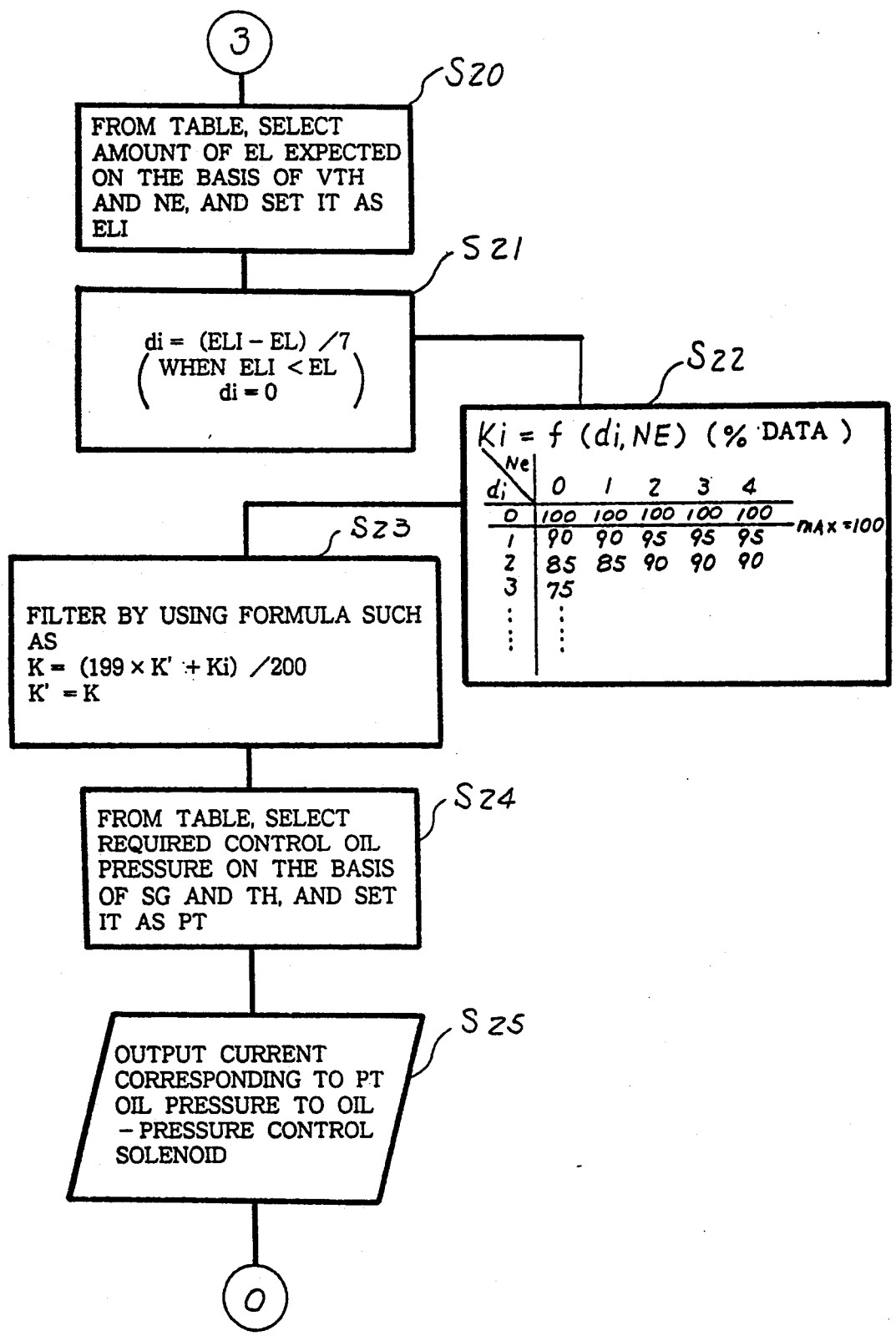

FIGS. 6A to 6C are flowcharts of the operation of the electronically controlled automatic transmission of the present invention.

Step S1: Initialization of the vehicle speed SP, throttle opening VTH, engine revolution NE, amount of engine intake air AF, engine load EL, and the like is effected.

Step S2: The vehicle speed SP is inputted.

Step S3: The throttle opening VTH, which is a reading by the throttle opening sensor 4, is inputted.

Step S4: The throttle opening VTH is corrected to obtain a proper line pressure for running at high elevation, and the corrected throttle opening TH is inputted.

$$TH = \frac{VTH \times K}{100}$$

wherein:

K: correction coefficient for running at high elevation.

Step S5: The engine speed NE is inputted.

Step S6: The amount of engine intake air (which may be intake air pressure) AF is inputted.

Step S7: The engine load EL is calculated. The engine load EL is expressed percentagewise by calculating such that the value of AF/NE during idling is set as 0%, and the value of AF/NE during maximum torque is set as 100%.

$$EL\ (\%) = \frac{(AF/NE - EL_y) \times 100}{EL_{max} - EL_y}$$

wherein:

$EL_y$: engine load during idling, $EL_{max}$: engine load during maximum torque.

Step S8: Divided point areas are formed in such as manner that THDi<TH<THDi1. That is, although the speed-change stage is selected on the basis of the throttle opening VTH and the vehicle speed SP during running, the speed-change point is not set in correspondence with each corrected throttle opening TH even if the corrected throttle opening TH changes continuously. Normally, the corrected throttle opening in the range of 0–100% is divided by a plurality of divided points, thereby forming divided point areas.

Accordingly, at this juncture, a specific divided area in which the detected and corrected throttle opening TH belongs is determined. Then, dividing points THDi and THDi1 in that area are determined.

Step S9: With respect to a case where a shiftup is effected from a present speed-change stage SG to an ensuing speed-change stage SG+1, a vehicle speed S1U corresponding to the throttle-opening dividing point THDi and a vehicle speed S2U corresponding to the throttle-opening THDi1 are selected from a speed-change point table.

Also, with respect to a case where a downshift is effected from the present speed-change stage SG to an ensuing speed-change stage SG−1, a vehicle speed S1D corresponding to the throttle-opening dividing point THDi and a vehicle speed S2D corresponding to the throttle-opening THDi1 are selected from the speed-change point table.

For this purpose, the divided areas of the corrected throttle opening TH and the vehicle speed SP, i.e., speed-change points, with respect to the upshifting and downshifting of each speed-change stage are stored in the speed-change point table.

Step S10: As described above, the corrected throttle opening TH assumes a continuous value, whereas the speed-change point table is divided into areas of the corrected throttle opening TH. Accordingly, an appropriate upshifting point SU for an actual corrected throttle opening TH is determined by an interpolation.

$$SU = \frac{S1U + (S2U - S1U) \times (TH - THi)}{THDi1 - THi}$$

Step S11: A downshifting point SD is similarly determined by an interpolation.

$$SD = \frac{S1D + (S2D - S1D) \times (TH - THi)}{THDi1 - THi}$$

Step S12: A determination is made as to whether or not the vehicle speed SP is greater than the upshifting point SU.

Step S13: If the vehicle speed SP is greater than the upshifting point SU, an upshift is effected by setting as the speed-change stage +SG 1.

Step S14: A determination is made as to whether or not the speed-change stage SG is greater than 4, and if the speed-change stage SG is greater, the operation proceeds to Step S15. If the speed-change stage SG is not greater than 4, the operation returns to Step S9.

Step S15: If the speed-change stage SG is greater than 4, the speed-change stage is set as 4.

Step S16: A determination is made as to whether or not the vehicle speed SP is smaller than the downshifting point SD.

Step S17: If the vehicle speed SP is smaller than the downshifting point SD, the speed-change stage SG is set as SG=SG−1.

Step S18: A determination is made as to whether or not the speed-change stage SG is smaller than 1.

Step S19: If the speed-change stage SG is smaller than 1, the speed-change stage SG is set to 1, and the operation returns to Step S9.

Step S20: A proper engine load is selected from the table on the basis of the throttle opening VTH and the engine speed NE detected, and set it as ELI.

For this purpose, data on the engine speed NE and the proper engine load ELI are stored in correspondence with the divided areas of the throttle opening VTH.

Step S21: A difference di between the proper engine load ELI and the actual engine load EL is determined.

$$di = (ELI - EL)/7$$

Here, the numeral 7 is a coefficient for setting the value of the difference di to an appropriate magnitude. In addition, when $$ELI < EL,$$

a setting provided as di=0.

Step S22: Determine a value of $K_i$ from the table on the basis of the difference di and the engine speed NE. The values of $K_i$ under various conditions are stored on the basis of empirical data.

$$K_i = f(di, NE) \text{ (\% data)}$$

Step S23: In this flowchart, the processing of one loop is effected for, for instance, each 20 seconds. A correction coefficient K is determined by filtering the value of $K_i$ so as to eliminate variations in the value of $K_i$ obtained in the above-described method.

$$K = (199^{33} K' + Ki)/200$$

wherein:
K': value of K in an immediately preceding loop.
The numerals 199 and 200 in the above formula are used to give added weight to K'.

Step S24: A necessary control oil pressure is selected from the table on the basis of the speed-change stage SG and the corrected throttle opening TH, and is set as a line pressure PT. Data for the control oil pressure corresponding to the respective divided areas of the corrected throttle opening TH are stored in the table.

Step S25: An electric current corresponding to the line pressure PT is outputted to the oil-pressure control solenoid 30.

A description will now be given of a second embodiment of the present invention.

Figure 7A:
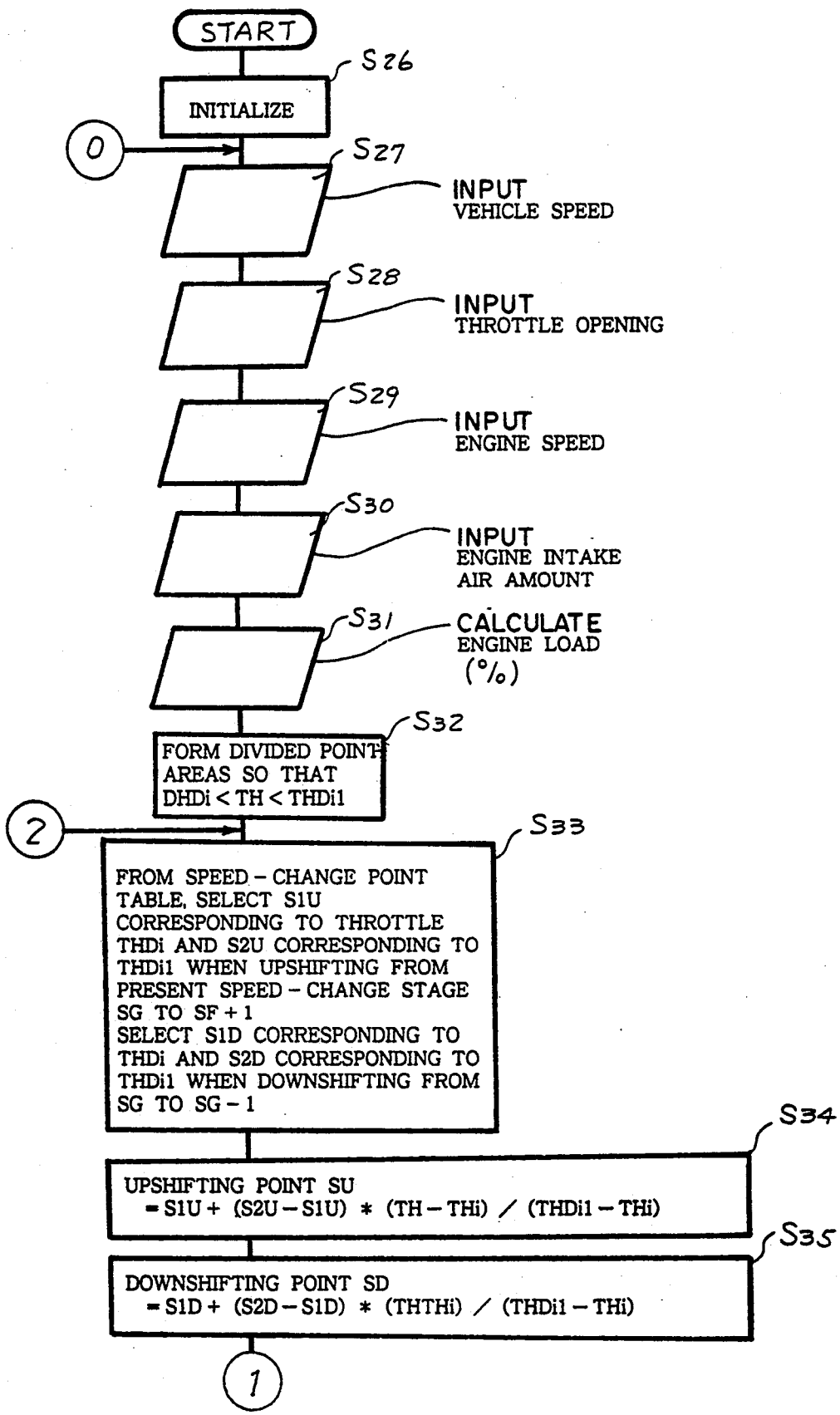
FIGS. 7A to 7C are flowcharts of the operation of the electronically controlled automatic transmission in accordance with a second embodiment of the present invention.
Figure 7B:
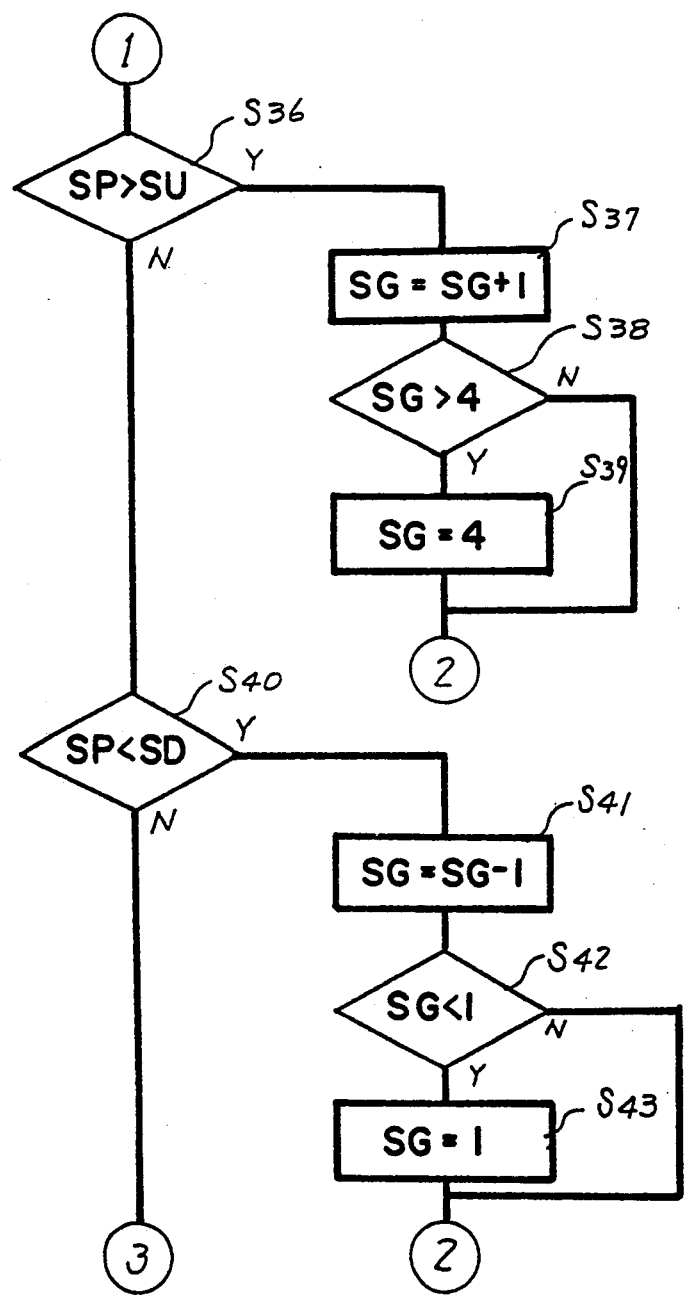
Figure 7C:
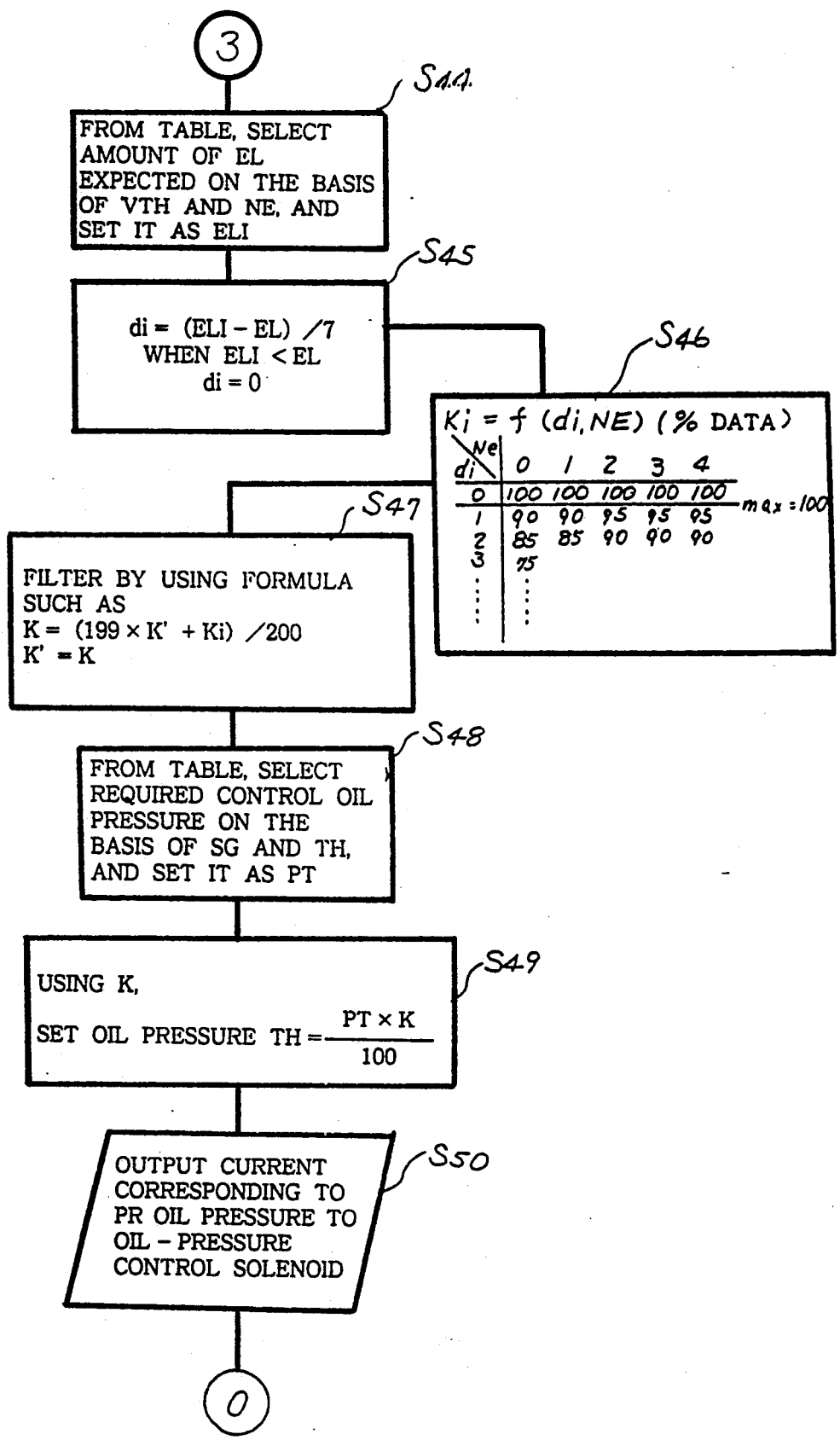

FIGS. 7A to 7C are flowcharts on the operation of the second embodiment of the electronically controlled automatic transmission in accordance with the present invention.

In this embodiment, the line pressure is corrected by multiplying the hydraulic oil pressure by the correction coefficient K.

Step S26: Initialization of the vehicle speed SP, throttle opening VTH, engine speed NE, amount of engine intake air AF, engine load EL, and the like is effected.

Step S27: The vehicle speed SP is inputted.

Step S28: The throttle opening VTH, which is a reading by the throttle opening sensor 4, is inputted.

Step S29: The engine speed NE is inputted.

Step S30: The amount of engine intake air AF (which may be intake air pressure) is inputted.

Step S31: The engine load EL is calculated. The engine load EL is expressed percentagewise by calculating such that the value of AF/NE during idling is set as 0%, and the value of AF/NE during maximum torque is set as 100%.

$$EL\ (\%) = \frac{(AF/NE - EL_y) \times 100}{EL_{max} - EL_y}$$

wherein:
$EL_y$: engine load during idling
$EL_{max}$: engine load during maximum torque.

Step S32: Divided point areas are formed in such as manner that THDi<TH<THDi1. That is, the specific divided area in which the detected and corrected throttle opening TH falls is determined. Then, the dividing points THDi and THDi1 in that area are determined.

Step S33: With respect to a case where a shiftup is effected from a present speed-change stage SG to an ensuing speed-change stage SG+1, the vehicle speed S1U corresponding to the throttle-opening dividing point THDi and the vehicle speed S2U corresponding to the throttle-opening THDi1 are selected from the speed-change point table.

Also, with respect to a case where a downshift is effected from the present speed-change stage SG to an ensuing speed-change stage SG−1, the vehicle speed S1D corresponding to the throttle-opening dividing point THDi and the vehicle speed S2D corresponding to the throttle-opening THDi1 are selected from the speed-change point table.

For this purpose, the divided areas of the corrected throttle opening TH and the vehicle speed SP, i.e., speed-change points, with respect to the upshifting and downshifting of each speed-change stage are stored in the speed-change point table.

Step S34: An appropriate upshifting point SU for an actual corrected throttle opening TH is determined by an interpolation.

$$SU = \frac{S1U(S2U - S1U) \times (TH - THi)}{THDi1 - THi}$$

Step S35: A downshifting point SD is similarly determined by an interpolation.

$$SD = \frac{S1D + (S2D - S1D) \times (TH - THi)}{THDi1 - THi}$$

Step S36: A determination is made as to whether or not the vehicle speed SP is greater than the upshifting point SU.

Step S37: If the vehicle speed SP is greater than the upshifting point SU, an upshift is effected by setting as the speed-change stage=SG+1.

Step S38: A determination is made as to whether or not the speed-change stage SG is greater than 4, and if the speed-change stage SG is greater, the operation proceeds to Step S39. If the speed-change stage SG is not greater than 4, the operation returns to Step S33.

Step S39: If the speed-change stage SG is greater than 4, the speed-change stage is set as 4.

Step S40: A determination is made as to whether or not the vehicle speed SP is smaller than the downshifting point SD.

Step S41: If the vehicle speed SP is smaller than the downshifting point SD, the speed-change stage SG is set as SG=SG−1.

Step S42: A determination is made as to whether or not the speed-change stage SG is smaller than 1.

Step S43: If the speed-change stage SG is smaller than 1, the speed-change stage SG is set to 1, and the operation returns to Step S33.

Step S44: A proper engine load is selected from the table on the basis of the throttle opening VTH and the engine speed NE detected, and set it as ELI.

For this purpose, data on the engine speed NE and the proper engine load ELI are stored in correspondence with the divided areas of the throttle opening VTH.

Step S45: A difference di between the proper engine load ELI and the actual engine load EL is determined.

$$di = (ELI - EL)/7$$

Here, the numeral 7 is a coefficient for setting the value of the difference di to an appropriate magnitude. In addition, when $$ELI < El,$$

a setting is provided as di=0.

Step S46: Determine a value of $K_i$ from the table on the basis of the difference di and the engine speed NE. The values of $K_i$ under various conditions are stored on the basis of empirical data.

$$K_i = f(di, NE) \text{ (\% data)}$$

Step S47: In this flowchart, the processing of one loop is effected for, for instance, each 20 seconds. A correction coefficient K is determined by filtering the value of $K_i$ so as to eliminate variations in the value of $K_i$ obtained in the above-described method.

$$K = (199 \times K' + Ki)/200$$

wherein:
K': value of K in an immediately preceding loop.

Step S48: A necessary control oil pressure is selected from the table on the basis of the speed-change stage SG and the corrected throttle opening TH, and is set as the line pressure PT. Data on the control oil pressure corresponding to the respective divided areas of the corrected throttle opening TH are stored in the table.

Step S49: To obtain a proper line pressure for running at a high elevation, the line pressure PT is corrected so as to be set as a corrected line pressure PR.

$$PR = \frac{PT \times K}{100}$$

wherein:
K: correction coefficient for running at high elevation.

Step S50: An electric current corresponding to the corrected line pressure PR is outputted to the oil-pressure control solenoid 30.

A description will now be given of a third embodiment of the present invention.

Figure 8A:
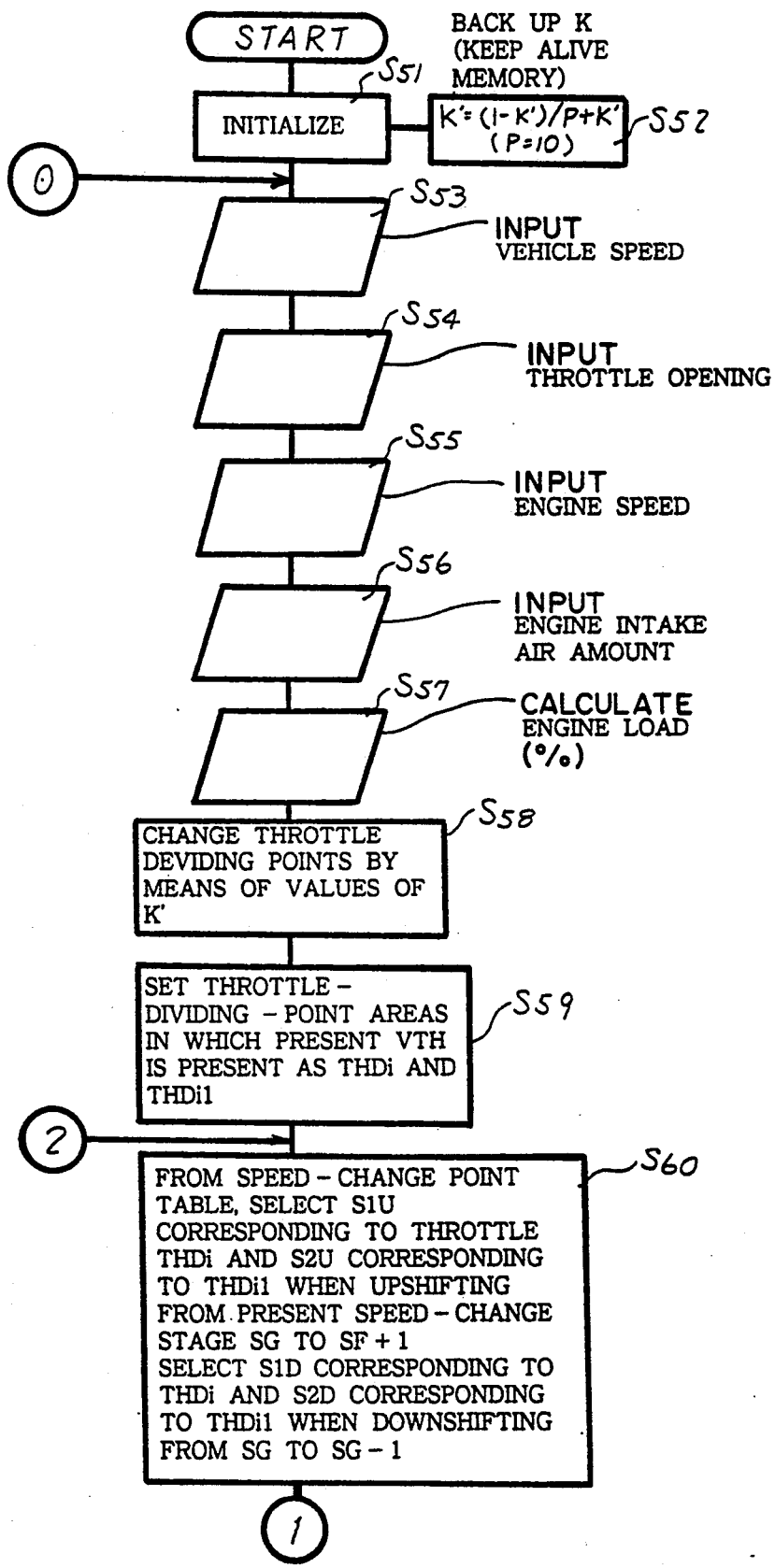
FIGS. 8A to 8C are flowcharts of the operation of the electronically controlled automatic transmission in accordance with a third embodiment of the present invention.
Figure 8B:
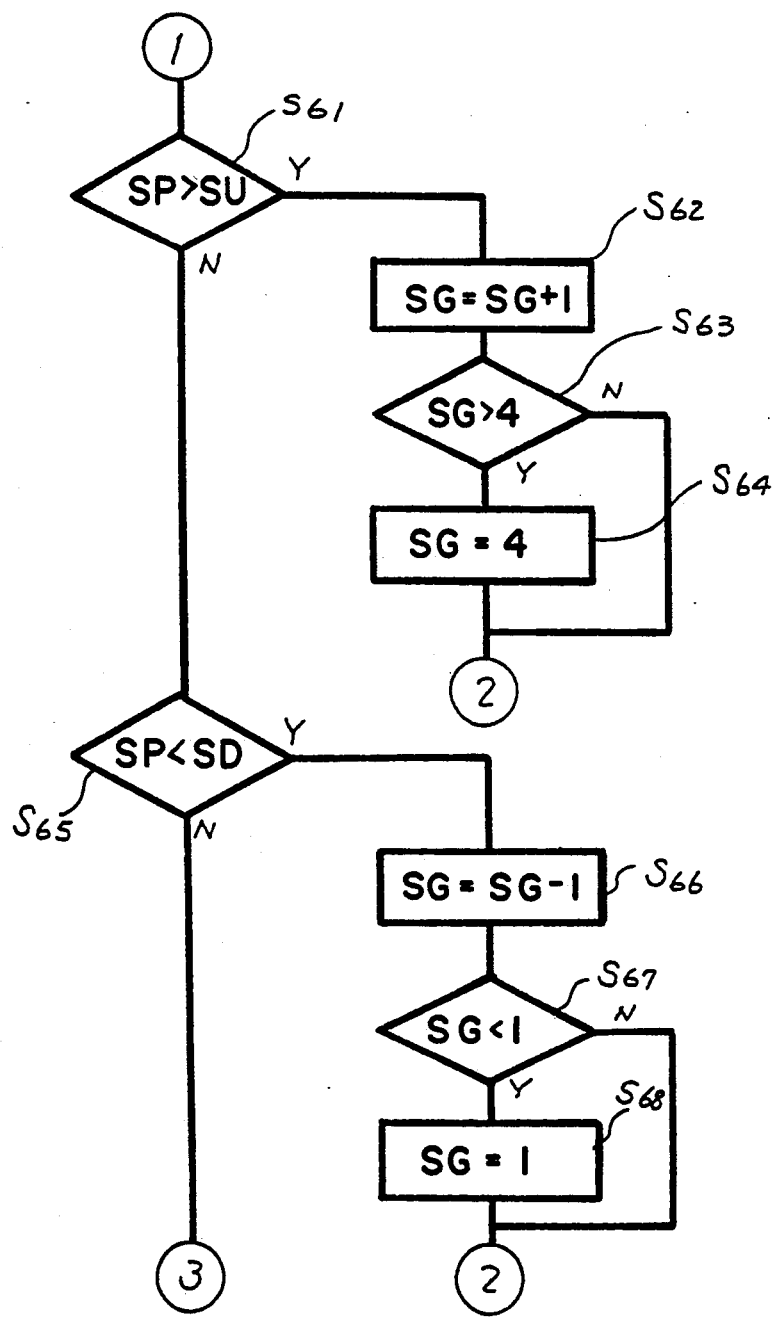
Figure 8C:
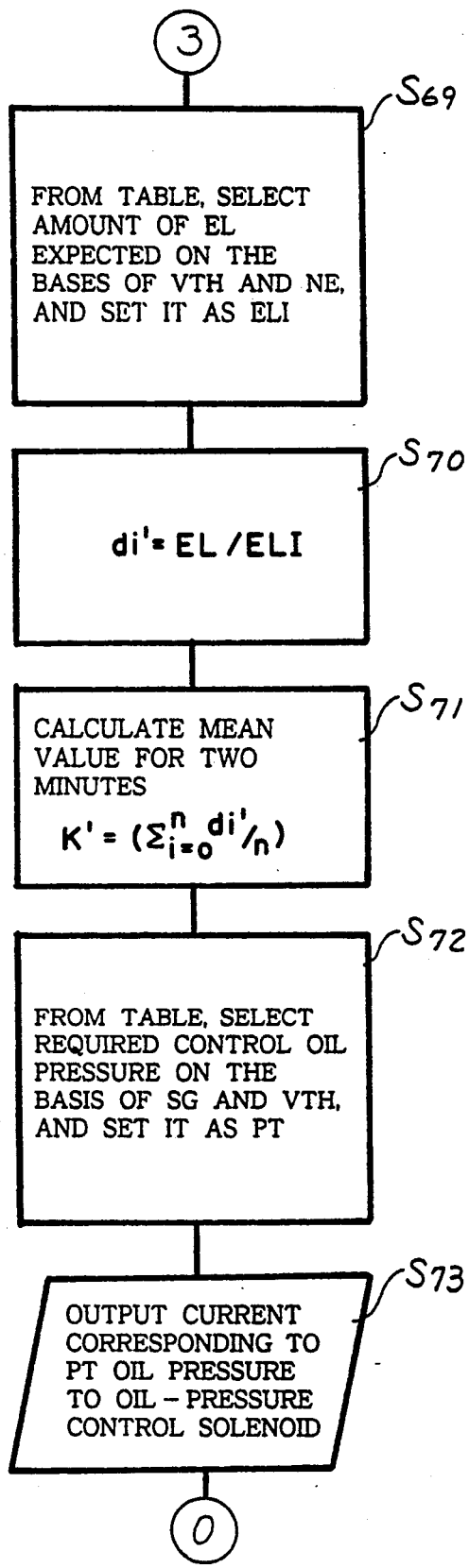

FIGS. 8A to 8C are flowcharts of the operation of the electronically controlled automatic transmission in accordance with the third embodiment of the present invention.

In this embodiment, there is provided a means for storing a correction coefficient even when an ignition switch of the vehicle is turned off. For this reason, a memory backed up by a battery is used.

Step S51: Initialization of the vehicle speed SP, throttle opening VTH, engine revolution NE, amount of engine intake air AF, engine load EL, and the like is effected.

Step S52: The correction coefficient K' is backed up by the battery (i.e., memory is retained).

At this juncture, a setting is provided such that $$K' = (1 - K')/P + K'(P = 10)$$

This step is taken so as to enhance safety by initializing the value of K' slightly toward the lower elevation running side when the ignition switch is turned on.

Step S53: The vehicle speed SP is inputted.

Step S54: The throttle opening VTH, which is a reading by the throttle opening sensor 4, is inputted.

Step S55: The engine speed NE is inputted.

Step S56: The amount of engine intake air (which may be intake air pressure) AF is inputted.

Step S57: The engine load EL is calculated. The engine load EL is expressed percentagewise by calculating such that the value of AF/NE during idling is set as 0%, and the value of AF/NE during maximum torque is set as 100%.

$$EL\ (\%) = \frac{(AF/NE - EL_y) \times 100}{EL_{max} - EL_y}$$

Step S58: The dividing point of the throttle opening VTH is altered by the value of the correction coefficient K'.

In this case, divided points for different values of the throttle opening VTH respectively corresponding to the values of the correction coefficient K' are stored in the table, and data is read from the table. Each dividing point of the throttle opening VTH is so set that the closer the dividing point toward the highland-running side, the higher the opening moves.

Step S59: Divided point areas are formed in such as manner that THDi<TH<THDi1. That is, a specific divided area to which the detected and corrected throttle opening TH belongs is determined. Then, the dividing points THDi and THDi1 in that area are determined.

Step S60: With respect to a case where a shiftup is effected from a present speed-change stage SG to an ensuing speed-change stage SG+1, the vehicle speed S1U corresponding to the throttle-opening dividing point THDi and the vehicle speed S2U corresponding to the throttle-opening THDi1 are selected from the speed-change point table.

Also, with respect to a case where a downshift is effected from the present speed-change stage SG to an ensuing speed-change stage SG−1, the vehicle speed S1D corresponding to the throttle-opening dividing point THDi and the vehicle speed S2D corresponding to the throttle-opening THDi1 are selected from the speed-change point table.

For this purpose, the divided areas of the corrected throttle opening TH and the vehicle speed SP, i.e., speed-change points, with respect to the upshifting and downshifting of each speed-change stage are stored in the speed-change point table.

Step S61: A determination is made as to whether or not the vehicle speed SP is greater than the upshifting point SU.

Step S62: If the vehicle speed SP is greater than the upshifting point SU, an upshift is effected by setting as the speed-change stage=SG+1.

Step S63: A determination is made as to whether or not the speed-change stage SG is greater than 4, and if the speed-change stage SG is greater, the operation proceeds to Step S64. If the speed-change stage SG is not greater than 4, the operation returns to Step S60.

Step S64: If the speed-change stage SG is greater than 4, the speed-change stage is set as 4.

Step S65: A determination is made as to whether or not the vehicle speed SP is smaller than the downshifting point SD.

Step S66: If the vehicle speed SP is smaller than the downshifting point SD, the speed-change stage SG is set as SG=SG−1.

Step S67: A determination is made as to whether or not the speed-change stage SG is smaller than 1.

Step S68: If the speed-change stage SG is smaller than 1, the speed-change stage SG is set to 1, and the operation returns to Step S60.

Step S69: A proper engine load is selected from the table on the basis of the throttle opening VTH and the engine speed NE detected, and set it as ELI.

For this purpose, data on the engine speed NE and the proper engine load ELI are stored in correspondence with the divided areas of the throttle opening VTH.

Step S70: A difference di' between the actual engine load EL and the proper engine load ELI is determined.

$$di' = EL/ELI$$

Step S71: A mean value of the aforementioned ratio di' is calculated, and is set as a correction coefficient K'.

$$K' = \left( \sum_{i=0}^{n} di'/n \right)$$

Step S72: A necessary control oil pressure is selected from the table on the basis of the speed-change stage SG and the throttle opening VTH, and is set as the line pressure PT.

Step S73: An electric current corresponding to the line pressure PT is outputted to the oil-pressure control solenoid 30.

It should be noted that the present invention is not restricted to the foregoing embodiments, and various modifications are possible within the spirit and scope of the present invention.

What is claimed is:

1. An electronically controlled automatic transmission having a plurality of hydraulic servos to be selectively actuated by oil pressure to produce a plurality of gear ratios, said transmission comprising:

an engine intake air amount sensor for detecting the amount of engine intake air (AF);

an engine speed sensor for detecting engine speed (NE); memory means for storing an initial value (EL$_I$) for (AF/NE);

computing means for determining a current value of (AF/NE)=(EL) based on the detected amount of the engine intake air (AF) and the detected engine speed (NE) and for determining a current correction coefficient based on said initial value (EL$_I$) and said current value of (AF/NE)=(EL); and regulating means for regulating the oil pressure supplied to the hydraulic servos in accordance with said current correction coefficient.

2. An electronically controlled automatic transmission according to claim 1, wherein said computing means determines a difference between said initial value (EL$_I$) and said current value (EL) or (AF/NE) and wherein said computing means determines said current correction coefficient based on said determined difference.

3. An electronically controlled automatic transmission according to claim 2 wherein said computing means periodically repeats said determination and averages said current correction coefficient with a previously determined correction coefficient and wherein said oil pressure is regulated in accordance with said averaged current correction coefficient.

4. An electronically controlled automatic transmission according to claim 1, wherein said computing means calculates said correction coefficient as a mean value of the ratio between said initial value ($EL_I$) and said current value (EL).

5. An electronically controlled automatic transmission according to claim 2, further comprising:
a throttle opening sensor for detecting throttle opening;
wherein said computing means corrects the detected throttle opening (TH) in accordance with said current correction coefficient; and
wherein said regulating means regulates the oil pressure supplied to the hydraulic servos in accordance with the corrected throttle opening.

6. An electronically controlled automatic transmission according to claim 3, further comprising:
a throttle opening sensor for detecting throttle opening;
wherein said computing means corrects the detected throttle opening in accordance with said current correction coefficient; and
wherein said regulating means regulates the oil pressure supplied to the hydraulic servos in accordance with the corrected throttle opening.

7. An electronically controlled transmission in accordance with claim 5, further comprising:
a first table, stored in said memory means, comprising a plurality of predetermined values for (AF/NE) correlated with data for said engine speed and for said throttle opening, and wherein said computing means determines said initial value ($EL_I$) by applying said detected engine speed (NE) and said detected throttle opening (TH) to said first table;
a second table containing predetermined values for differences (di) between ($EL_I$) and (EL) correlated with plural values for engine speed (NE) and correction coefficient;
and wherein said computing means periodically repeats said determination of (EL), determines a difference (di) between the most recently determined value (EL) and a previously determined value (EL) and applies said determined difference (di) to said second table to determine said current correction coefficient.

8. An electronically controlled automatic transmission having a plurality of hydraulic servos to be selectively actuated by oil pressure to produce a plurality of gear ratios, said transmission comprising:
a throttle opening sensor for detecting throttle opening (TH);
an engine intake air amount sensor for detecting the amount of engine intake air (AF);
an engine speed sensor for detecting engine speed (NE);
memory means for storing initial values ($EL_I$) for (AF/NE), said initial values being stored in the form of a first table, in correspondence with data for engine speed and throttle opening;
computing means for computing an actual value of (AF/NE)=(EL) based on the detected amount of the engine intake air (AF) and the detected engine speed (NE), for retrieving from memory an initial value ($EL_I$) in accordance with the detected throttle opening and for determining a correction coefficient based on said retrieved initial value and the computed actual value of (AF/NE)=(EL); and
regulating means for regulating oil pressure supplied to the hydraulic servos in accordance with said correction coefficient.

9. An electronically controlled automatic transmission according to claim 8, wherein said computing means calculates said correction coefficient as a mean value of the ratio between said initial value ($EL_I$) and said actual value (EL).

10. An electronically controlled automatic transmission according to claim 8, wherein said computing means corrects the detected throttle opening in accordance with said correction coefficient and wherein said regulating means regulates the oil pressure supplied to the hydraulic servos in accordance with said corrected throttle opening.

11. An electronically controlled automatic transmission in accordance with claim 8 further comprising:
a second table containing predetermined values for differences (di) between ($EL_I$) and (EL), correlated with plural correction coefficients;
and wherein said computing means periodically repeats said determination of (EL), determines a difference (di) between the most recently determined value (EL) and a previously determined value (EL) and applies said determined (di) to said second table to determine said current correction coefficient from among said plural correction coefficients.

12. An electronically controlled transmission in accordance with claim 11 wherein said (di) values and said plural correction coefficients in said second table are correlated with (NE) values and wherein said computing means determines said current correction coefficient by applying said determined difference (di) and said detected (NE) to said second table.

13. An electronically controlled automatic transmission according to claim 1, wherein said initial value ($EL_I$) is expressed as a percentage (AF/NE), with (AF/NE) during idling being set as 0%, and the value of (AF/NE) during maximum torque being set as 100%.

14. An electronically controlled automatic transmission according to claim 8, wherein said initial values ($EL_I$) are expressed as percentages of (AF/NE), with (AF/NE) during idling being set as 0%, and the value of (AF/NE) during maximum torque being set as 100%.

* * * * *

UNITED STATES PATENT AND TRADEMARK OFFICE
CERTIFICATE OF CORRECTION

PATENT NO. : 5,189,931

DATED : March 2, 1993

INVENTOR(S) : SUZUKI et al

It is certified that error appears in the above-identified patent and that said Letters Patent is hereby corrected as shown below:

Col. 1, line 14, delete "all" and insert --are--.

Col. 3, line 56, after "to" insert --the--; and line 57, delete "the", first instance.

Col. 7, line 34, delete "+SG 1" and insert --SG+1--.

Col. 8, line 17, delete entire line and insert

--K=(199xK' + Ki)/200--.

Col. 9, line 23, delete entire line and insert the following formula:

$$-- \quad SU=S1U + \frac{(S2U-S1U) \times (TH-THi)}{THDi1 - THi} \quad --.$$

UNITED STATES PATENT AND TRADEMARK OFFICE
CERTIFICATE OF CORRECTION

PATENT NO. : 5,189,931
DATED : March 2, 1993
INVENTOR(S) : Kenji Suzuki

It is certified that error appears in the above-indentified patent and that said Letters Patent is hereby corrected as shown below:

Column 12, line 58, delete "or" and insert --of--.

Signed and Sealed this

Eleventh Day of January, 1994

*Attest:*

BRUCE LEHMAN

*Attesting Officer*   *Commissioner of Patents and Trademarks*